June 29, 1943.    C. E. BURNETT    2,323,116
LUMINESCENT MATERIAL
Filed Oct. 30, 1941

INVENTOR
Carlos E. Burnett
BY Charles McClair
ATTORNEY

Patented June 29, 1943

2,323,116

UNITED STATES PATENT OFFICE 2,323,116

LUMINESCENT MATERIAL

Carlos E. Burnett, Maplewood, N. J., assignor to Radio Corporation of America, a corporation of Delaware Application October 30, 1941, Serial No. 417,094

10 Claims. (Cl. 250—81)

My invention relates to luminescent materials or phosphors and particularly to phosphor mixtures suitable for producing light of a constant color when excited by corpuscular energy of varying intensity.

Many luminescent screens for use in cathode ray tubes consist of a mixture of two phosphor materials, each fluorescing with a different color, the mixture being such that the light emitted from the screen appears to be white or approximately white at a predetermined beam current. When the voltage is maintained constant and the beam current changes, the relative strength of the colors also changes, particularly when the beam current becomes high, thus causing a color shift. For many purposes it is desirable that the color of the screen remain substantially the same over a considerable range of beam current.

In a cathode ray tube operating with substantially constant voltage the luminescence or light output for current input varies with the beam current. Since the light output of a luminescent material is not directly proportional to the excitation energy input, especially when the excitation energy is corpuscular energy such as cathode rays, the efficiency of the phosphor, if plotted as a characteristic curve, is not a straight line. In general, the efficiency of a phosphor does not change greatly with increase in beam current until the beam current becomes moderately high, but the efficiency decreases rapidly as the beam current becomes still higher, until the phosphor saturates at some value of beam current above which an increase in beam current produces practically no increase in luminescence of the phosphor. Since the saturation of the various phosphors commonly used occurs at different values of beam current, and the rate of saturation, that is, the non-linearity of light output with current input, is different, a screen consisting of two phosphors will exhibit a color shift, particularly when the beam current reaches the value at which the phosphors are partially saturated to different degrees. For example, a cathode ray tube may be made with a screen consisting of blue emitting activated zinc sulphide and yellow emitting activated zinc beryllium silicate or germanate in such proportions that with a beam current of moderate value the screen gives substantially white light. However, with increase in beam current the sulphide approaches complete saturation at a greater rate than does the silicate and with such further increase in beam current the luminescence of the silicate predominates over that of the sulphide and the combined luminescence shifts in color toward the yellow.

It is an object of my invention to provide a phosphor or luminescent material mixture capable of producing a substantially constant color over a wide range of intensities of luminescence exciting energy. It is another object to provide a screen wherein the color is substantially invariant under different intensities of excitation. It is a further object to provide a mixed phosphor screen wherein the rate of saturation of the phosphor or phosphors having one luminescent color is substantially equal to the rate of saturation of the phosphor or phosphors having a different luminescent color whereby the combined luminescent color is independent of wide variations in excitation intensities. It is a further object to provide a mixture of phosphors wherein the rate of saturation of the phosphor components producing one color and the rate of saturation of the phosphors producing another color are substantially equal when subjected to different intensities of exciting energy. These and other objects, features and advantages of my invention will become apparent to those skilled in the art when considered in view of the following description and the accompanying drawing wherein:

Figure 1:
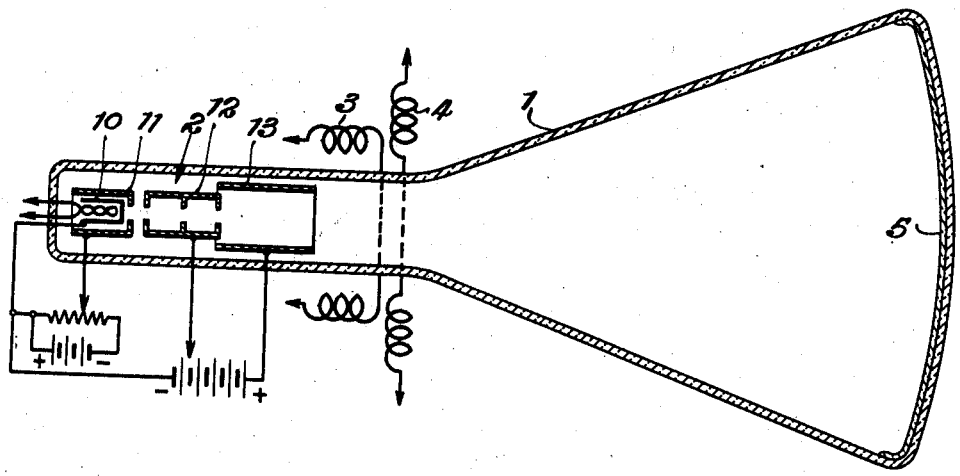
Fig. 1 shows a cathode ray tube incorporating a mixed phosphor screen.

While I will refer to the use of my improved phosphor mixture with particular reference to a cathode ray tube incorporating a phosphor screen, it will be appreciated that my invention is not limited to this particular embodiment but that my principle of mixing phosphors and the mixed phosphors which I describe in some detail may be used in other applications, such as in the development of luminescent light or with other forms of incident corpuscular energy rather than with the specific cathode ray energy utilized in a cathode ray tube. Referring to Fig. 1, the tube 1 may be of conventional form having a neck section incorporating an electron gun 2 for the development of an electron beam surrounded over a portion of its length by beam deflection means, such as horizontal and vertical deflection coils 3 and 4 which, when energized with proper current variations, sweep the electron beam over a luminescent phosphor screen 5 deposited on the end of the tube opposite the neck section. The electron gun includes an electron source or cathode 10, an electron beam intensity control electrode 11 and conventional first and second anodes 12 and 13 connected to a conventional potential source at points which are positive with respect to the cathode 10. The electrons emitted by the cathode are controlled in quantity or intensity and directed toward and upon the phosphor screen 5 by the first and second anodes to produce a beam of electrons incident on the screen. My invention is particularly directed to the use of my phosphor screen in a tube such as the type shown wherein the intensity or quantity of electrons comprising the beam is varied, such as by the control electrode 11. The potential applied to the electrode 11 may be from a conventional bias source with or without modulation in accordance with a signal, such as a television picture signal.

In accordance with my invention I provide a phosphor screen comprising at least three constituents and choose for one constituent a phosphor which has the same spectral characteristics or luminescent color as another of the phosphor constituents but of different saturation characteristics. In addition, I provide the third constituent of a phosphor having different luminescent color and a saturation characteristic intermediate those of the other constituents. Thus, with a material comprising a plurality of at least three different phosphor materials, one of the materials is chosen to have a spectral emission band equivalent to another of the two other materials but a different saturation characteristic than either of the other materials. Further, I so combine the said three constituents that the luminescent color of the combined constituents in combination is substantially unvaried under different intensities of exciting energy.

Figure 2:
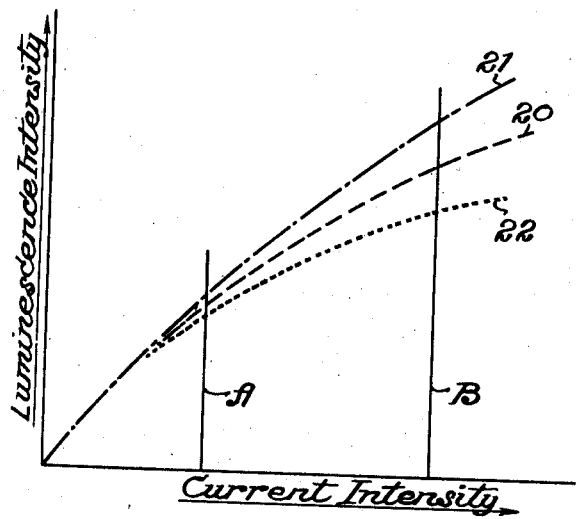
Fig. 2 shows a system of curves representative of various components of a mixed phosphor screen under varying degrees of exciting energy.

Referring to Fig. 2 I have shown three curves of different phosphor materials with luminescent intensity plotted as ordinates with exciting current intensity plotted as abscissae. In Fig. 2 the dashed curve 20 represents luminescent output with increasing intensities of exciting energy such as electron beam current for a material such as blue emitting zinc sulphide. It will be noted that for higher intensities of exciting current the luminescence is less than directly proportional to the exciting energy. The curve, therefore, becomes concave downward and may be said to saturate under further increase of exciting energy. The dot-dash curve 21 lying above the curve 20 is representative of zinc beryllium silicate. This material approaches saturation more slowly than does the zinc sulphide and the rate of saturation is lower than the sulphide. It will be noted that the vertical distance between the curves 20 and 21 under a low current excitation at A is less than the distance between the curves at a higher value of excitation as at B. Consequently, if these two materials are the constituents of the screen, the color shifts to a yellow under high current excitation and approaches the luminescent color of the silicate phosphor constituent. However, if, in accordance with my invention, two phosphor constituents of the same luminescent color are mixed with a third constituent of a different luminescent color and the average of the saturation characteristics of the two constituents is the same as that of the third constituent, no color variation will occur when such a three constituent mixture is excited by a variable current cathode ray beam. Thus, if a material, such as a yellow emitting zinc cadmium sulphide which saturates more rapidly than yellow emitting zinc beryllium silicate, is added to a mixture of such zinc sulphide and zinc beryllium silicate, the resultant mixture has substantially a constant color over the normally used exciting current intensity range. In this manner and for the example cited the loss due to the early saturation of a yellow cadmium sulphide constituent, as shown by the curve 22, is made up by the less saturating yellow silicate constituent, the yellow constituents being such as to complement as nearly as possible the saturation curve of the blue sulphide constituent throughout the exciting energy range as shown by Fig. 2.

For a given color, such as white, it will be appreciated that as another yellow color constituent is added to a yellow-blue phosphor combination, the original yellow constituent in that combination must be decreased so that the luminescent color of the resultant material is not shifted toward the yellow. This replacement should be made in accordance with the relative efficiencies of the yellow material with respect to the exciting energy. Thus, for example, yellow emitting zinc beryllium silicate is somewhat less efficient than yellow emitting zinc cadmium sulphide under corpuscular exciting energy. Therefore, as zinc cadmium sulphide is added to a two constituent mixture wherein the yellow constituent is zinc beryllium silicate, a given amount of zinc cadmium sulphide must replace a larger amount of zinc beryllium silicate if the color of the resultant three constituent mixture is to remain unvaried.

Zinc sulphide activated with 0.01% by weight of silver may be used to provide the luminescent blue component of white light. For the luminescent yellow component the two phosphor constituents may be zinc beryllium silicate and zinc cadmium sulphide. The zinc beryllium silicate constituent may be of the manganese activated type having the general molal proportions based on the oxides of: $9ZnO \cdot BeO \cdot 6SiO_2$, the manganese being 2.37 molal percent. The zinc cadmium sulphide constituent may be of the silver activated type the weight ratio of zinc sulphide to cadmium sulphide to activator being as 48 to 52 to 0.01 respectively. It will be appreciated that it is not expedient to set forth particular proportions of the three mentioned materials with respect to one another inasmuch as the efficiency, spectral range and saturation characteristic vary with methods of manufacture, such as impurity content, crystallizing temperature and particle size of the phosphor crystals. The effect of these as well as other factors in determining the properties of luminescent materials is well known to those skilled in the art so that depending upon the methods of manufacture of the various phosphor constituents of my mixed screen, the proportions for mixing these phosphors will vary over wide limits. I have found, however, that in general the amount of zinc beryllium silicate, zinc sulphide and zinc cadmium sulphide in the mixture should decrease in weight in the order given. During cathode ray tube processing such as during baking and exhaust the zinc sulphide constituent is deleteriously affected to a greater extent than the other two components so that the amount of zinc sulphide may be greater than the amount of the silicate to allow for such loss in efficiency and still provide a screen of the desired color.

It will be appreciated that the particular example cited above is only one of many which may be given to illustrate my invention and my method of choosing phosphor constituents for a mixed phosphor screen having a white luminescence. It should also be appreciated that my invention is applicable where a predominance of one component color of a mixed screen is desired such as a blue or a yellow predominance. In such a case the saturation characteristics of two constituents of a single luminescent color are matched with respect to that of the third in the same manner except that slightly more of the yellow or blue constituents are used, depending on which color is to predominate. Consequently, while I have described only a limited number of uses to which my invention may be applied and have given a limited number of examples of particular phosphors, it will be appreciated that my invention should not be limited to the specific use set forth or to the examples cited except as my invention is so limited by the appended claims.

I claim:

1. A luminescent phosphor mixture having substantially invariant luminescent color under variable cathode ray intensity bombardment and comprising two phosphor constituents having substantially the same color of luminescence when excited by cathode rays and a third phosphor constituent having a luminescent color complementary to the color of said two components when excited by cathode rays the luminescent intensity of said one constituent increasing with increasing cathode ray intensity bombardment at a rate intermediate the corresponding rates of said two constituents.

2. A luminescent phosphor mixture comprising at least three phosphor constituents each of which saturate at different rates under varying intensities of exciting energy, one of said constituents being the luminescent color complement of two other constituents, said other constituents having substantially the same luminescent color, the proportions of said three constituents being such that the luminescent color of said mixture is substantially invariant under varying intensities of exciting energy.

3. A luminescent phosphor mixture comprising at least three constituents, two of which luminesce with substantially the same color and have a combined light output when excited which varies in accordance with the light output of a third constituent when all three said constituents are subjected to the same varying intensities of exciting energy.

4. A luminescent phosphor mixture comprising two phosphor constituents having substantially the same color of luminescence when excited by cathode rays and different current saturation characteristics under varying intensities of cathode ray excitation and a third constituent having a luminescent color different from that of said two constituents and a current saturation characteristic intermediate said different characteristics of said two constituents.

5. A luminescent phosphor comprising a mechanical mixture of three phosphor constituents, each having different current saturation characteristics under varying intensities of cathode ray excitation, the constituent having the intermediate current saturation characteristic being of one color and the other two constituents being of the same color which differs from that of the constituent having the intermediate current saturation characteristic.

6. A luminescent phosphor comprising a mechanical mixture of three constituent phosphors, one of said phosphors exhibiting blue luminescence and the other two exhibiting yellow luminescence under cathode ray excitation, each of said phosphor constituents being such as to approach current saturation at different rates under increasing current cathode ray excitation, the rate of current saturation of the constituent exhibiting blue luminescence being intermediate the rates of current saturation of the two constituents exhibiting yellow luminescence.

7. A luminescent phosphor comprising a three constituent mixture of two constituents luminescent under cathode ray excitation with the same color and a third constituent luminescent under cathode ray excitation with a different color, the proportions of said constituents being such that the combination of said two components approach current saturation at the same rate as the constituent of different color of luminescence with increasing current intensity of cathode rays.

8. A luminescent three constituent phosphor which luminesces with substantially unvaried color under different current intensities of cathode ray excitation comprising a mixture of yellow luminescing zinc beryllium silicate, yellow luminescing zinc cadmium sulphide and blue luminescing zinc sulphide.

9. A phosphor mixture as claimed in claim 8 wherein the yellow and blue luminescing constituents are mixed in proportion to provide white luminescence and the blue luminescing constituent saturates under increasing current excitation at a rate intermediate the rates of saturation of said yellow luminescing constituents.

10. A luminescent phosphor mixture comprising three constituents as follows, a yellow luminescing manganese activated zinc beryllium silicate conforming approximately to the molal proportions of $9ZnO \cdot BeO \cdot 6SiO_2$, a yellow luminescing silver activated zinc cadmium sulphide having a zinc sulphide to cadmium sulphide weight ratio of 48 to 52, and a blue luminescing activated zinc sulphide, said constituents being so proportioned as to produce substantially white luminescence under varying intensities of cathode ray excitation.

CARLOS E. BURNETT.